(12) United States Patent
Ngan et al.

(10) Patent No.: US 8,165,211 B2
(45) Date of Patent: Apr. 24, 2012

(54) METHOD AND APPARATUS OF DE-INTERLACING VIDEO

(75) Inventors: King Ngi Ngan, Hong Kong (CN); Jie Dong, Hangzhou (CN); Yan Huo, Shenzhen (CN)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 999 days.

(21) Appl. No.: 12/129,891

(22) Filed: May 30, 2008

(65) Prior Publication Data

US 2009/0296815 A1      Dec. 3, 2009

(51) Int. Cl.
*H04N 7/12* (2006.01)
(52) U.S. Cl. .................................................. 375/240.16
(58) Field of Classification Search .................. None
See application file for complete search history.

(56) References Cited

U.S. PATENT DOCUMENTS

| | | | |
|---|---|---|---|
| 6,269,484 B1 | 7/2001 | Simsic | |
| 7,227,895 B1 * | 6/2007 | Wang et al. | 375/240.16 |
| 7,844,580 B2 * | 11/2010 | Srivastava et al. | 707/690 |
| 7,876,830 B2 * | 1/2011 | Katayama et al. | 375/240.16 |
| 2002/0196362 A1 * | 12/2002 | Yang et al. | 348/452 |
| 2004/0066466 A1 | 4/2004 | MacInnis | |
| 2004/0205539 A1 * | 10/2004 | Mak et al. | 715/511 |
| 2005/0179814 A1 * | 8/2005 | Pau et al. | 348/448 |
| 2006/0126739 A1 * | 6/2006 | Stoner | 375/240.16 |
| 2006/0209960 A1 * | 9/2006 | Katayama et al. | 375/240.16 |
| 2007/0229704 A1 | 10/2007 | Mohapatra | |
| 2007/0230571 A1 * | 10/2007 | Kodama | 375/240.12 |
| 2008/0069214 A1 * | 3/2008 | Hagai et al. | 375/240.14 |
| 2008/0069230 A1 * | 3/2008 | Kondo et al. | 375/240.16 |

\* cited by examiner

*Primary Examiner* — Gary Mui
*Assistant Examiner* — Hicham Foud
(74) *Attorney, Agent, or Firm* — Ella Cheong Hong Kong; Margaret A. Burke; Sam T. Yip

(57) ABSTRACT

The presently claimed invention adaptively selects a local de-interlacing method according to information from a compressed video bitstream. According to one embodiment, successive images from a video bitstream are first reconstructed. Syntax elements, selected from a macroblock type, a macroblock partition, a motion vector, a distance from a reference frame, the existence of non-zero transform coefficients and the distribution of transform coefficients, are then extracted from this bitstream. Based on the syntax elements, a de-interlacing algorithm is decided from an algorithm set for each image region in a video frame. Algorithms in the algorithm set include motion compensation, edge-based line averaging, and line averaging. Each image region is thereby interpolated using the de-interlacing algorithm and complementary motion compensation. The complementary motion compensation de-interlaces the image region using an inverse of motion vectors extracted from a bitstream clip representing neighboring frames.

11 Claims, 7 Drawing Sheets

METHOD AND APPARATUS OF DE-INTERLACING VIDEO

TECHNICAL FIELD

The present invention relates generally to video processing. More particularly, aspects of the invention relate to methods and apparatus for de-interlacing video.

BACKGROUND OF THE INVENTION

Many known TV and video standards, such as NTSC, utilize interlacing for video coding. For example, odd or even lines of an image are drawn on the screen alternatively for every $60^{th}$ of a second, with each line being updated at a frame rate of 30 frames per second. One reason is that traditional, long established display devices such as CRT televisions could not support high refresh rate for full frame. Through video interlacing, flickering can be reduced due to persistence of vision effect while the vertical resolution can be maintained.

In modern display devices that do not support display of interlaced video, such as LCD display types, de-interlacing has to be applied to interlaced video to obtain the missing lines in each of the odd line and even line frames by interpolation.

SUMMARY OF THE INVENTION

This presently claimed invention adaptively selects a local de-interlacing method according to the information from the compressed video bitstreams, and is compatible with parallel implementation.

A video frame can be de-interlaced by many methods, including line averaging, edge-base line averaging, and motion compensation. Among these methods, motion compensation is often more preferred because it can provide a superior image quality compared to line averaging.

In general, the macroblocks in a coded video can be classified into intra-coded macroblocks and inter-coded macroblocks. While intra-coded macroblocks are coded without adopting motion compensation, such kind of macroblocks may actually involve motion. However, since they are temporally too far away from their reference fields, motion compensation is not utilized as a coding method in video standards.

Aspects of the presently claimed invention have been developed to make full use of the information from compressed video bitstreams, such as an H.264 bitstream, in order to enhance the chance of applying motion compensation, hereinafter referred as complementary motion compensation.

One type of information to be considered in determining de-interlacing methods is the size of the macroblock partition, which indicates the smoothness of motion and textures. Another type of information to be considered is the distribution of the transform coefficients, which reflects the presence of edges. Additionally, motion vector is also taken into account for finding the reference blocks in temporally neighboring fields.

Complementary motion compensation allows finding a reference block in non-referred neighboring fields such as when they are not indicated by the video bitstream, when the reference fields indicated by the video bitstream are temporally too far away.

In certain embodiments, the method of decoding the video bitstream includes reconstructing successive images from a video bitstream; extracting a plurality of syntax elements from the video bitstream; deciding a de-interlacing algorithm from an algorithm set for each image region in a video frame based on the syntax elements; and interpolating the image regions using the de-interlacing algorithm and complementary motion compensation.

The complementary motion compensation de-interlaces the image regions using the inverse of motion vectors extracted from the bitstream clip representing neighboring frames. In one exemplary embodiment, it interpolates image pixels from an immediately neighboring frame based on the inverse of a motion vector, wherein said motion vector points to the current frame from said immediately neighboring frame.

Advantageously, the algorithm set further includes line averaging, edge-base line averaging and motion compensation.

The method may also include storing the results of deciding a de-interlacing algorithm for each image region in an array.

The decision of using a de-interlacing algorithm may be based on syntax elements such as: macroblock types, macroblock partitions, motion vectors, the distance from the reference frame, the existence of non-zero transform coefficients or the distribution of transform coefficients.

The method may be applied to video bitstream coded under video standards such as AVS and H.264.

Other aspects of the claimed invention are also disclosed.

BRIEF DESCRIPTION OF DRAWINGS

Embodiments of the invention are described in more detail hereinafter with reference to the drawings, in which.

DETAILED DESCRIPTION

Improved methods and apparatus for de-interlacing video frames are disclosed herein. In the following description, numerous specific details, including macroblock sizes, frame sequences, image patterns, pixel patterns, and the like are set forth. However, from this disclosure, it will be apparent to those skilled in the art that modifications, including additions and/or substitutions may be made without departing from the scope and spirit of the invention. In other circumstances, specific details may be omitted so as not to obscure the invention. Nonetheless, the disclosure is written as to enable one skilled in the art to practice the teachings of the embodiments of the invention without undo experimentation.

Figure 1:
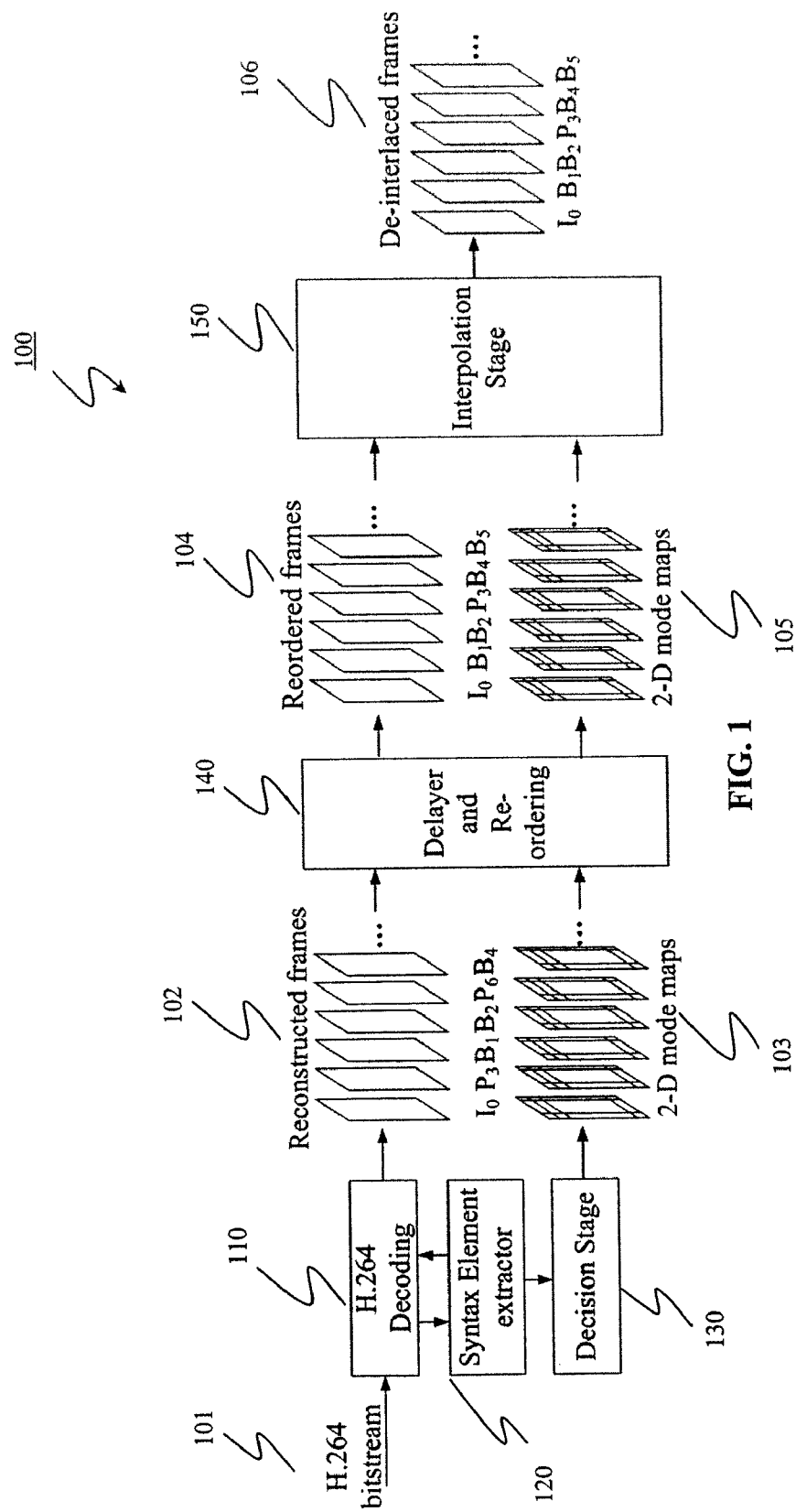
FIG. 1 is a block diagram illustrating a de-interlacing system in accordance with an embodiment of the claimed invention.

FIG. 1 is a block diagram illustrating a de-interlacing system 100 in accordance with an embodiment of the claimed invention. The de-interlacing system 100 converts interlaced video signals into non-interlaced video signals by interpolating the missing lines in a frame. To begin with, video bitstream 101 received from transmitter or storage media is fed into a video decoding module 110. In an exemplary embodiment, the video bitstream 101 and video decoding module 110 is compatible with the H.264 industrial standard. The video decoding module 110 decodes the video bitstream 101 and reconstructs the video frames 102. A syntax element extractor 120 also extracts syntax elements from the video bitstream 101. In an exemplary embodiment, information such as macroblock types, macroblock partitions, motion vectors, the distance from the reference frame, the existence of non-zero transform coefficients and the distribution of transform coefficients are extracted.

The syntax elements are provided to a decision stage 130 which determines the modes of de-interlacing for various regions of a video frame. In one exemplary embodiment, each region corresponds to a macroblock in a video frame, while such macroblock is processed in a subsequent interpolation stage 150 by a dedicated processing unit (not shown). In another exemplary embodiment, the decision stage 130 output decisions for de-interlacing mode as two-dimensional arrays, also referred hereinafter as 2-D mode maps 103. Each 2-D mode map corresponds to a reconstructed video frame 102. The de-interlacing mode, also referred as interpolation method, for each processing unit (not shown) is determined based on the values of syntax elements. However, the syntax elements may not necessarily reflect the real motion, due to the encoding strategies and the restriction of the standards. It is therefore important to select the proper de-interlacing mode for an image region. In certain situations, where motion exists but the decision stage 130 determines the de-interlacing algorithm other than motion compensation according to the syntax elements from syntax element extractor 120, the presently claimed invention determines complementary motion compensation as the de-interlacing mode by analyzing the real motion, such that the interpolation stage 150 can replace the non-motion-compensation method with the motion compensation one and accord better with the real motions of the video sequences.

The reconstructed video frames 102 and corresponding 2-D mode maps 103 are then received by a delayer and re-ordering unit 140. The delayer and re-ordering unit 140 delays each of the reconstructed frames 102 and rearranges the same into a sequence of re-ordered frames 104 according to temporal order. The 2-D mode maps 102 are also rearranged based on the sequence of the corresponding re-ordered frames into re-ordered 2-D mode maps 105. Both the reordered frames 104 and the re-ordered 2-D mode maps are subsequently input to an interpolation stage 150. The interpolation stage 150 de-interlaces the re-ordered frames 104 according to the decisions on corresponding re-ordered 2-D mode maps 105. Consequently, the interpolation stage 150 outputs de-interlaced frames 106 for display by a display device (not shown).

In one exemplary embodiment, the decision stage 130 and interpolation stage 150 can be implemented independently by separate processing units, including but not limited to digital signal processors, microprocessors, FPGAs and ASICs.

Figure 2:
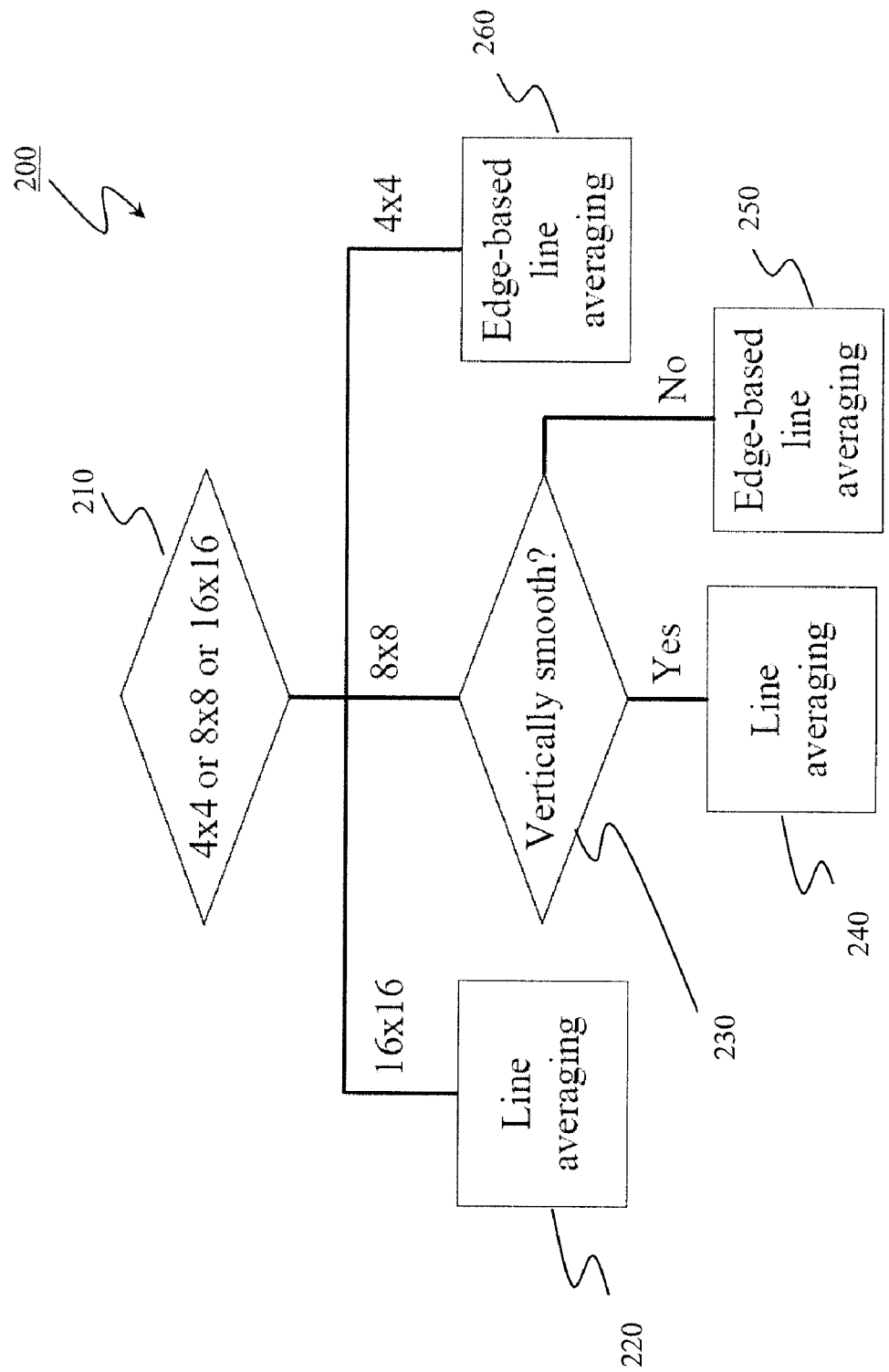
FIG. 2 is a flow chart for determining the mode of de-interlacing for intra-coded marcoblocks in the decision stage.

FIG. 2 is a flow chart for the decision stage 200 to determine the mode of de-interlacing for intra-coded marcoblocks in the decision stage of FIG. 1. According to an exemplary embodiment, at partition-checking step 210, the partition of the macroblock is obtained from the syntax elements and examined. Processing continues at first line averaging step 220 if the partition is large, i.e.: 16×16 in the example. Processing continues at signal-checking step 230 if the partition is medium, i.e.: 8×8 in the example, while processing continues at first edge-based line averaging step 260 for small partition, i.e.: 4×4 in the example.

At signal-checking step 230, the distribution of the transform coefficients of the macroblock is examined. If the prediction errors of the content of the macroblock are vertically smooth, which means that the prediction errors of the macroblock are coded by 8×8 transforms and each 8×8 transformed block does not have non-zero coefficients in the bottom 8×4 area, processing continues at second line averaging step 240. Otherwise, processing continues at second edge-based line averaging step 250.

At first line averaging step 220 and second line averaging step 240, line averaging, which is simple and efficient for vertically smooth areas, i.e., areas without vertical aliasing, is determined as the mode of de-interlacing for the macroblock. At first edge-based line averaging step 260 and second edge-based line averaging step 250, edge-based line averaging, which has outstanding performance for sharp and consistent edges inside the non-vertically-smooth areas, is determined as the mode of de-interlacing for the macroblock.

Figure 3:
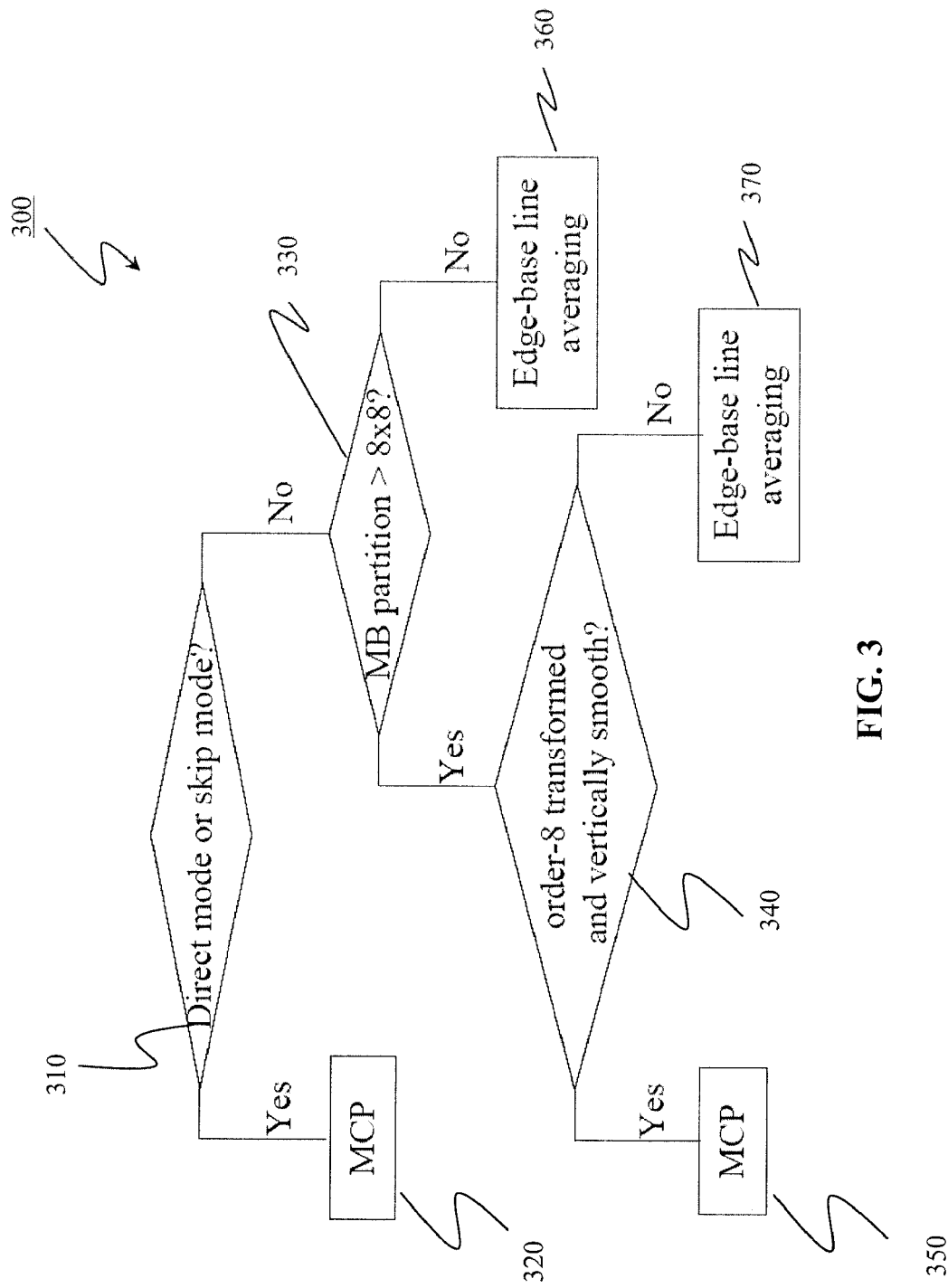
FIG. 3 is a flow chart for determining the mode of de-interlacing for inter-coded marcoblocks in the decision stage.

FIG. 3 is a flow chart for determining the mode of de-interlacing for inter-coded marcoblocks in the decision stage of FIG. 1. At mode-checking step 310, the video coding mode is checked. If the video stream is coded in direct mode or skip mode, processing continues at step 320. Otherwise processing continues at partition-checking step 330.

At partition-checking step 330, the size of the macroblock partition is examined. Processing continues at transform-checking step 340 if the macroblock partition is large, i.e.: larger than 8×8 in the exemplary embodiment. Otherwise, processing continues at step 360.

At transform-checking step 340, it is examined from the syntax elements whether the macroblock is encoded under 8×8 transform and whether the prediction errors of the content of the macroblock are vertically smooth. If the macroblock is 8×8 transformed and the prediction errors of the content are also vertically smooth (the concept of vertical smoothness can be referred back to paragraph 31), processing continues at step 350. Otherwise, processing continues at step 370.

At step 320 and step 350, motion compensation is determined as the mode of de-interlacing for the macroblock. At first edge based line averaging step 360 and second edge based line averaging step 370, edge-based line averaging is determined as the mode of de-interlacing for the macroblock.

Figure 4:
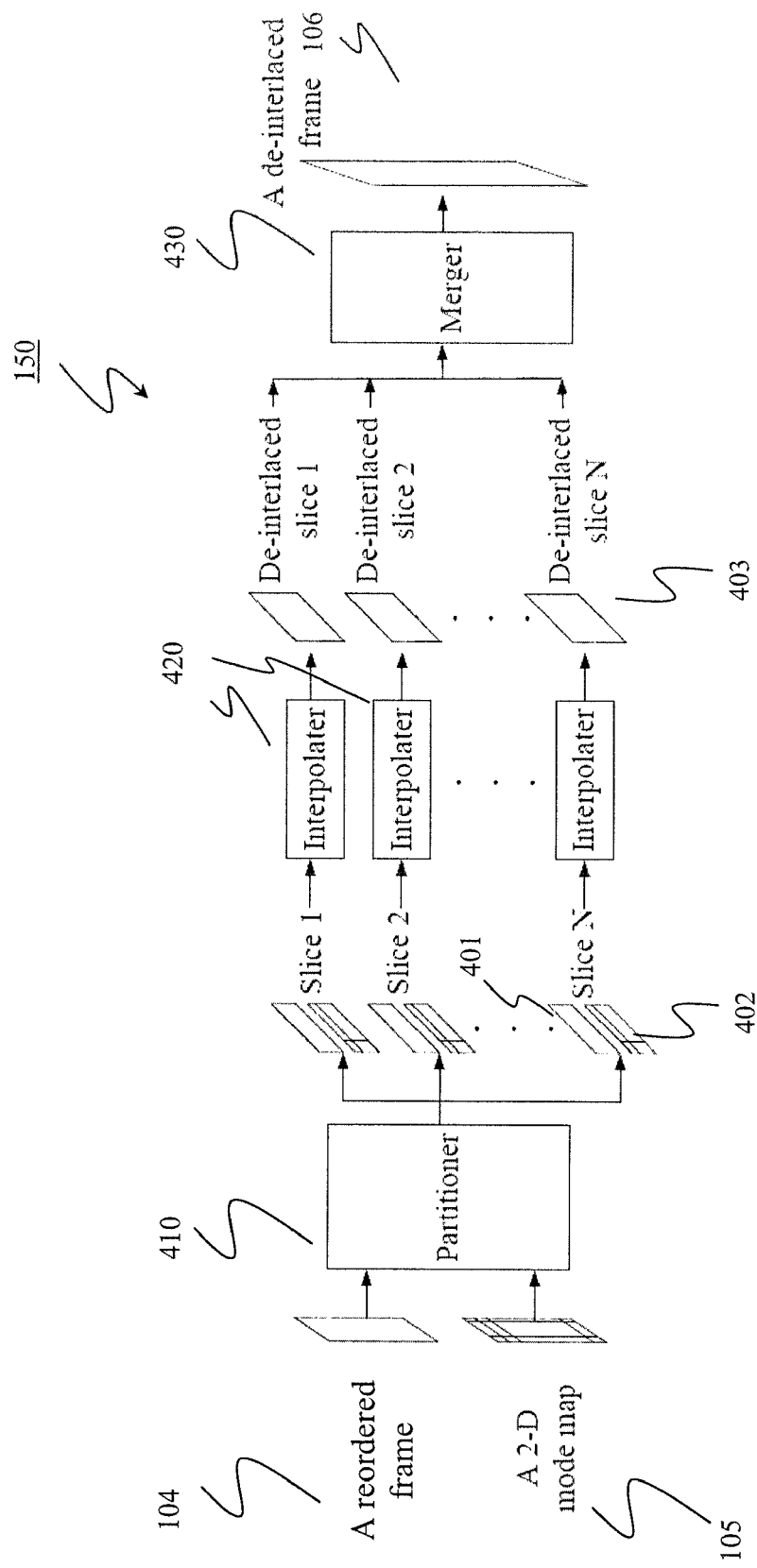
FIG. 4 is a block diagram illustrating the interpolation stage.

FIG. 4 is a block diagram illustrating the interpolation stage 150 in FIG. 1. In the illustrated embodiment, interpolation stage 150 is implemented by parallel processing of interpolaters 420 in parallel architecture. Initially, re-ordered frames 104 and 2-D mode maps 105 are provided by the delayer and re-ordering unit (not shown) to a partitioner 410. The partitioner 410 divide each re-ordered frame 104 into image slices 401 based on the number of CPU cores. The 2-D mode map 105 corresponding to the re-ordered frame 104 is also partitioned into sliced 2-D mode map 402. Each set of image slice 401 and sliced 2-D mode map 402 is input to a corresponding interpolater 420. The interpolater 420 refers to the decision information on the sliced 2-D mode map 402 and de-interlaces the image slice 401 with the proper mode. As such, different parts of an image field can be de-interlaced independently under the proper mode. In an exemplary embodiment, the mode of de-interlacing is chosen from line edging, edge-base line edging, motion compensation, and complementary motion compensation. After de-interlacing, each interpolater 420 outputs a respective de-interlaced slice

403 which is sent to a merger 430. The merger then assembles the de-interlaced slices 403 according to corresponding coordinate information and generates a de-interlaced frame 106.

Figure 5:
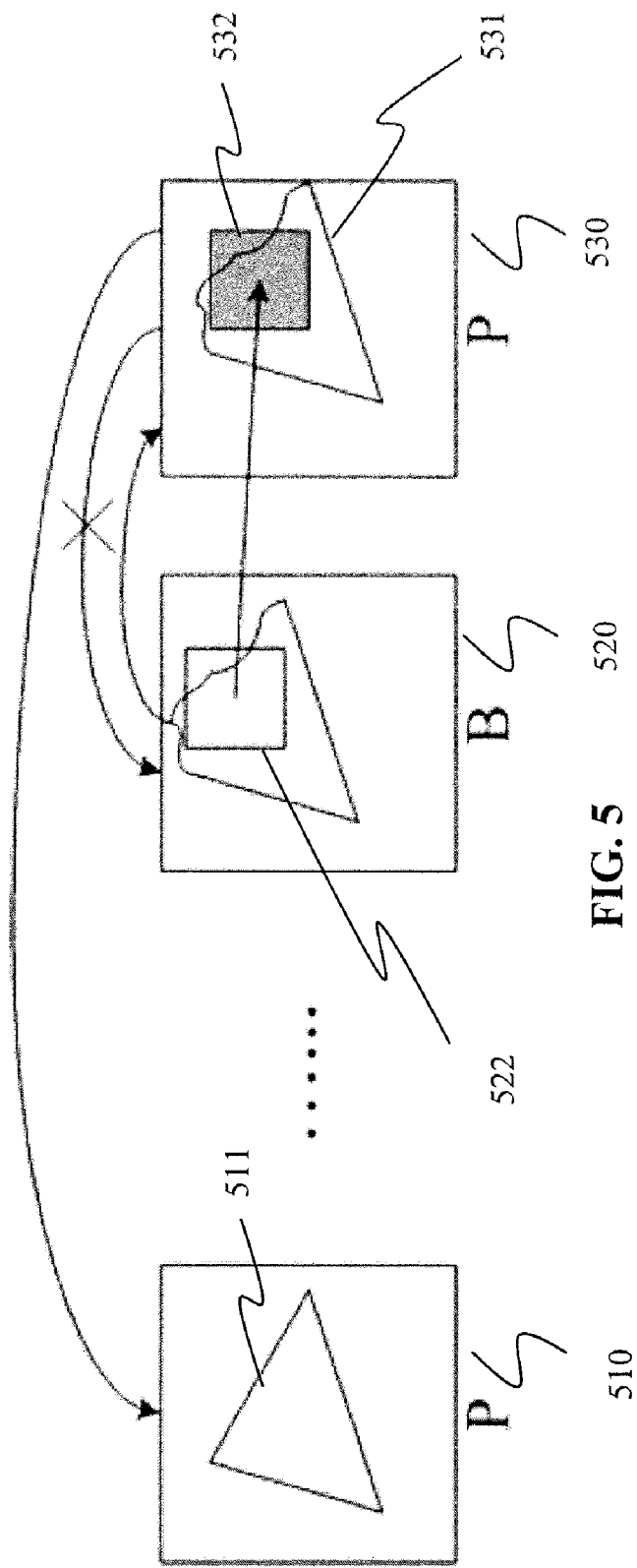
FIG. 5 depicts the scenario where complementary motion compensation is used in accordance with an embodiment of the claimed invention.

FIG. 5 shows the scenario, in which complementary motion compensation is used, in accordance with an embodiment of the claimed invention. The complementary motion compensation (CMCP) according to the presently claimed invention can be referred as an updating process in the interpolation stage. CMCP is applied to the frames, hereinafter referred as target CMCP frames, which, as restricted by the bitstreams, are located temporally far from their reference frames in the frame sequence. For example, target CMCP frames can be the P frames 530 in IBBPBBP sequence structures, where IBBPBBP notates the sequential order of the relevant I frame, B frames and P frames. In a further exemplary embodiment, the target CMCP frames can be hierarchical B frames. More accurately speaking, CMCP is especially adopted when processing units (such as the interpolators in FIG. 4) process the macroblock in target CMCP frames, which is coded in intra mode. According to the flow chart in FIG. 2, the de-interlacing mode, or interpolation method, is determined to be intra in the decision stage.

However, it is common scenario that an intra-coded macroblock 532 in the target CMCP frame 530 may contain motion. When the later P frame 530 (which is the target CMCP frame) is far from its reference frame, i.e., the earlier P frame 510, the macroblock 532 in the triangular object 531 cannot find a perfectly matching block in the reference frame 510. This is because the edge of the triangular object 511 has changed over such a long interval. The encoder has no choice but to use intra mode to code the macroblock 532. Consequently, the associated processing unit has to select intra-field interpolation method such as line averaging or edge-base line averaging.

Assuming the macroblock 532 actually contains motion, it has a perfectly matching block 522 in a previous B frame 520. However, this B frame 520 cannot be referenced by the P frame 530 due to a restriction of the video coding standard. Under this circumstance, the quality of de-interlacing is actually superior if motion compensation is used, as compared to intra-field interpolation. In the decision stage according to the presently claimed invention, the motion of the macroblock 532 is taken into account. Accordingly, CMCP is chosen as the mode of de-interlacing to acquire better image quality.

Figure 6:
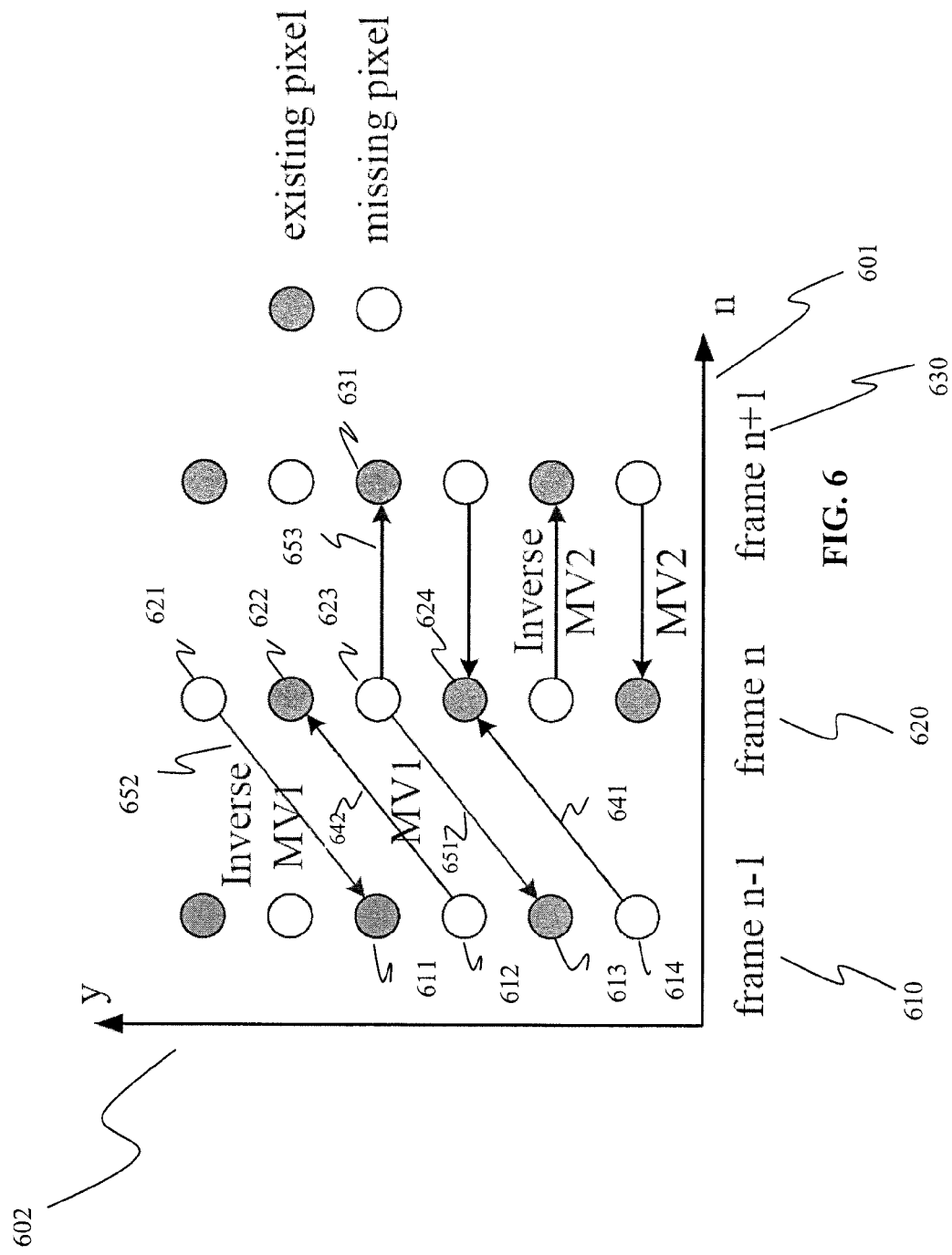
FIG. 6 depicts the method of complementary motion compensation for interpolating missing pixels by reference to existing pixels in immediately neighboring frames in accordance with an embodiment of the claimed invention.

FIG. 6 depicts the method of complementary motion compensation for interpolating missing pixels by reference to existing pixels in immediately neighboring frames in accordance with an embodiment of the claimed invention. For convenience of illustration, each frame is considered as a line of pixels which extend in the y direction 602. The x-axis 601 represents the time axis, while frame n−1 610, frame n 620, frame n+1 630 are shown in sequential order from left to right.

Frame n 620 is the target CMCP frame, in which the CMCP is applied. The horizontal and vertical coordinates represent the time and line, respectively. Under CMCP, the immediately neighboring frame n−1 610 and frame n+1 630 are used as the references for de-interlacing frame n 620.

The existing pixels 622, 624 in frame n 620 are used as the references by the processing unit M in the frame n−1 610 with the motion vectors MV1 641, 642 (among syntax elements extracted from the bitstream) to interpolate missing pixels 612, 614. Furthermore, the reference and target blocks are perfectly matched. Therefore, the missing pixels 621, 623 in frame n 620 can be interpolated from pixels 611, 613 in frame n−1 610 by motion vector 651, 652, which are the inverse of MV1 641, 642.

In an exemplary embodiment, two blocks are taken as perfectly matched if the transform coefficients of M are all zero as indicated by the coded block pattern (CBP) in the bitstream.

As the missing field of frame n and the existing fields of frames n−1 610 and n+1 630 have the same interlacing parity (i.e., odd or even), the inverse motion vector 651, 653 always points to the existing pixels 613, 631 in frame n−1 610 and n+1 630. Therefore, both the existing pixels 613, 631 from frames n−1 610 and n+1 630 can be used as reference pixels to interpolate the missing pixel 623 in frame n 620. In such situation, the mean of the respective interpolation values will be used as the final interpolation value. The CMCP can increase the usage of motion compensation method, which is superior to intra-field method and can reduce flickers.

Figure 7:
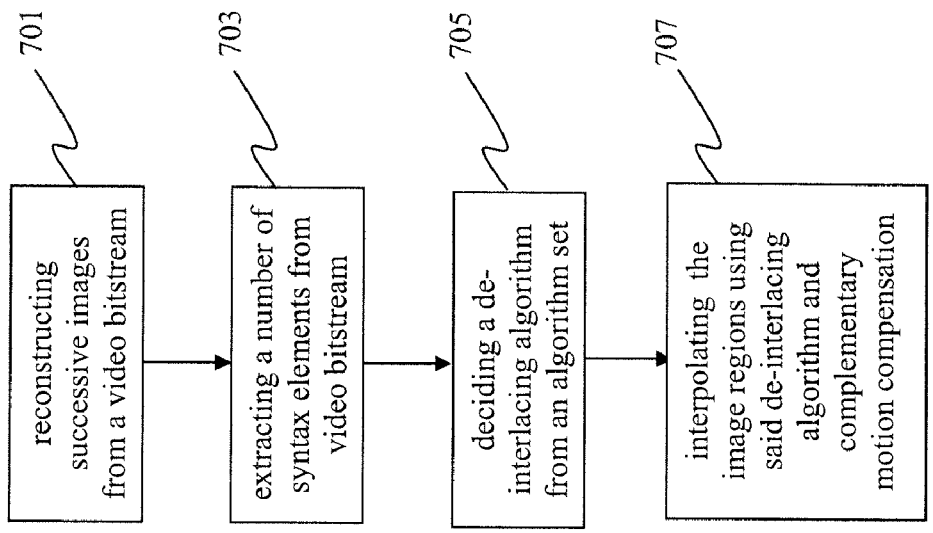
FIG. 7 is a flow chart representing embodiments of the claimed method.

FIG. 7 is a flow chart representing embodiments of the claimed method. One embodiment of the claimed method of decoding a video bitstream begins with reconstructing 701 successive images from a video bitstream followed by extracting 703 a plurality of syntax elements from said video bitstream. After extracting step 703, the deciding step 705 decides a de-interlacing algorithm from an algorithm set for each image region in a video frame based on said plurality of syntax elements followed by interpolating step 707 for interpolating each said image region using said de-interlacing algorithm or complementary motion compensation and complementary motion compensation de-interlaces said image region using the inverse of motion vectors extracted from neighboring frames.

The foregoing description of embodiments of the present invention are not exhaustive and any update or modifications to them are obvious to those skilled in the art, and therefore reference is made to the claims for determining the scope of the present invention.

We claim:

1. A method of decoding video bitstream, comprising:
reconstructing successive images from a video bitstream;
extracting a plurality of syntax elements from said video bitstream, wherein the syntax elements are selected from a macroblock type, a macroblock partition, a motion vector, a distance from a reference frame, existence of non-zero transform coefficients, or a distribution of transform coefficients;
deciding a de-interlacing algorithm from an algorithm set for each image region in a video frame based on said plurality of syntax elements, the deciding of the de-interlacing algorithm comprising one of:
 adopting motion compensation as the de-interlacing algorithm for inter-coded macroblocks in neither direct mode nor skip mode, wherein the macroblock partition is larger than 8×8, and wherein the macroblocks are 8×8 transformed and prediction errors of content of the macroblocks are vertically smooth;
 adopting edge-based line averaging as the de-interlacing algorithm for inter-coded macroblocks in neither direct mode nor skip mode, wherein the macroblock partition is larger than 8×8, and wherein prediction errors of content of the macroblocks are neither 8×8 transformed nor vertically smooth; or
 adopting edge-based line averaging as the de-interlacing algorithm for inter-coded macroblocks in neither direct mode nor skip mode, wherein the macroblock partition is not larger than 8×8; and
interpolating each said image region using said de-interlacing algorithm and complementary motion compensation; wherein said complementary motion compensation de-interlaces said image region using an inverse of motion vectors extracted from a bitstream clip representing neighboring frames.

2. The method of decoding video bitstream according to claim 1, wherein said complementary motion compensation de-interlaces said image region using the inverse of motion vectors extracted from neighboring frames, wherein said motion vectors point to a current frame from said neighboring frames.

3. The method of decoding video bitstream according to claim 1, wherein said algorithm set further comprises one or more algorithms selected from the group consisting of line averaging, edge-based line averaging, and motion compensation.

4. The method of decoding video bitstream according to claim 1, further comprising storing in an array the results of deciding a de-interlacing algorithm from an algorithm set for each of said image region.

5. The method of decoding video bitstream according to claim 1, wherein said deciding a de-interlacing algorithm comprising adopting line averaging as the de-interlacing algorithm for intra-coded macroblocks having partition 16×16 or for intra-coded macroblocks having partition 8×8, wherein prediction errors of content of the macroblocks are vertically smooth.

6. The method of decoding video bitstream according to claim 1, wherein said deciding a de-interlacing algorithm comprising adopting edge-based line averaging as the de-interlacing algorithm for intra-coded macroblocks having partition 4×4 or for intra-coded macroblocks having partition 8×8, wherein prediction errors of content of the macroblocks are not vertically smooth.

7. The method of decoding video bitstream according to claim 1, wherein said deciding a de-interlacing algorithm comprising adopting motion compensation as the de-interlacing algorithm for inter-coded macroblocks under direct mode or skip mode.

8. The method of decoding video bitstream according to claim 1, additionally comprising receiving video bitstream which is coded under video standards selected from the group consisting of AVS and H.264.

9. An apparatus for decoding video bitstream, comprising:
a decoder for reconstructing successive images from a video bitstream;
a syntax element extractor for extracting a plurality of syntax elements from said video bitstream, wherein the syntax elements are selected from a macroblock type, a macroblock partition, a motion vector, a distance from a reference frame, existence of non-zero transform coefficients, or a distribution of transform coefficients;
a decision stage unit for deciding a de-interlacing algorithm from an algorithm set for each image region in a video frame based on said plurality of syntax elements, the deciding of the de-interlacing algorithm comprising one of:
    adopting motion compensation as the de-interlacing algorithm for inter-coded macroblocks in neither direct mode nor skip mode, wherein the macroblock partition is larger than 8×8, and wherein the macroblocks are 8×8 transformed and prediction errors of content of the macroblocks are vertically smooth;
    adopting edge-based line averaging as the de-interlacing algorithm for inter-coded macroblocks in neither direct mode nor skip mode, wherein the macroblock partition is larger than 8×8, and wherein prediction errors of content of the macroblocks are neither 8×8 transformed nor vertically smooth; or
    adopting edge-based line averaging as the de-interlacing algorithm for inter-coded macroblocks in neither direct mode nor skip mode, wherein the macroblock partition is not larger than 8×8; and
interpolaters for interpolating each said image region using said de-interlacing algorithm and complementary motion compensation, wherein said complementary motion compensation de-interlaces said image region using an inverse of motion vectors extracted from a bitstream clip representing neighboring frames.

10. The apparatus of decoding video bitstream according to claim 9, wherein said complementary motion compensation de-interlaces said image region using the inverse of motion vectors extracted from neighboring frames, wherein said motion vectors point to a current frame from said neighboring frames.

11. The apparatus of decoding video bitstream according to claim 9, wherein said algorithm set further comprises an algorithm selected from the group consisting of line averaging, edge-base line averaging, and motion compensation.

* * * * *